United States Patent
Fan et al.

(10) Patent No.: US 11,982,838 B2
(45) Date of Patent: May 14, 2024

(54) OPTICAL LENS

(71) Applicant: ANHUI EASPEED TECHNOLOGY CO., LTD., Anhui (CN)

(72) Inventors: Chao Fan, Anhui (CN); Dongcheng Han, Anhui (CN)

(73) Assignee: ANHUI EASPEED TECHNOLOGY CO., LTD., Anhui (CN)

( * ) Notice: Subject to any disclaimer, the term of this patent is extended or adjusted under 35 U.S.C. 154(b) by 292 days.

(21) Appl. No.: 17/451,084

(22) Filed: Oct. 15, 2021

(65) Prior Publication Data

US 2022/0035097 A1    Feb. 3, 2022

Related U.S. Application Data

(63) Continuation of application No. PCT/CN2019/091018, filed on Jun. 13, 2019.

(30) Foreign Application Priority Data

May 21, 2019   (CN) .......................... 201910422146.8
May 21, 2019   (CN) .......................... 201920728700.0

(51) Int. Cl.
*G02B 6/122*       (2006.01)
(52) U.S. Cl.
CPC .................................. *G02B 6/122* (2013.01)
(58) Field of Classification Search
CPC ................................................... G02B 6/122
See application file for complete search history.

(56) References Cited

FOREIGN PATENT DOCUMENTS

| CN | 102566059 | 7/2012 |
| CN | 105511028 | 4/2016 |
| CN | 107340567 | 11/2017 |
| CN | 107807417 | 3/2018 |
| CN | 107831558 A | 3/2018 |
| CN | 207502758 U | 6/2018 |
| CN | 110208896 A | 9/2019 |
| CN | 110208902 A | 9/2019 |
| CN | 209746177 U | 12/2019 |

(Continued)

OTHER PUBLICATIONS

English machine translation of CN'107807417A—published on Mar. 18, 2018 (Year: 2018).*

(Continued)

*Primary Examiner* — Sung H Pak
(74) *Attorney, Agent, or Firm* — Grossman, Tucker, Perreault, & Pfleger, PLLC

(57) ABSTRACT

An optical lens includes: two transparent substrates, each transparent substrate being provided with two optical surfaces; and two optical waveguide arrays, arranged between the two transparent substrates by means of glue, optical waveguide extending directions of the two optical waveguide arrays being arranged orthogonally; each optical waveguide array including a plurality of optical waveguide units, each optical waveguide unit having a rectangular cross section, and the plurality of optical waveguide units being joined in parallel; an outer contour of the optical waveguide array being a rectangle and an extending direction of the optical waveguide unit and at least two sides of the outer contour of the optical waveguide array forming an angle of 30 to 60 degrees.

11 Claims, 9 Drawing Sheets

(56) References Cited

FOREIGN PATENT DOCUMENTS

| WO | 2016203894 A1 | 12/2016 |
| WO | 2017146016 A1 | 8/2017 |
| WO | 2017175671 A1 | 10/2017 |
| WO | 2018105445 A1 | 6/2018 |

OTHER PUBLICATIONS

International Search Report from corresponding PCT Appln. No. PCT/CN2019/091018, dated Feb. 14, 2020.
First notice of Examination Opinions Issued by CNIPA on Jan. 19, 2024, from corresponding Chinese application 201910422146.8 (english translation attached).
Patent Search Record Information from corresponding Chinese application 201910422146.8 (2 pages).

* cited by examiner

US 11,982,838 B2

OPTICAL LENS

CROSS-REFERENCE TO RELATED APPLICATION

This application is a continuation of International Application No. PCT/CN2019/091018, filed on Jun. 13, 2019, which is based upon and claims priority to Chinese Patent Application No. 201910422146.8, filed on May 21, 2019, and Chinese Patent Application No. 201920728700.0, filed on May 21, 2019, the entire contents of which are incorporated herein by reference.

FIELD

The disclosure relates to the field of optics. In detail, the disclosure relates to an optical lens.

BACKGROUND

Requirements on imaging characteristics are increasing with the development of air imaging technologies. On one hand, a higher resolution is required, a picture sharpness observed is ensured as well as a small distortion requirement is also satisfied. On another hand, three-dimensional (3D) display characteristics and naked-eye 3D holographic display are both required.

Imaging technologies in the related art mainly adopts a lens for imaging. Due to a limitation of a field of view and aperture. The lens imaging manner has optical aberrations such as spherical aberration, coma aberration, astigmatism, field curvature, distortion, chromatic aberration. Therefore, the lens imaging manner is greatly limited in the field of large-field and large-aperture imaging display.

SUMMARY

An optical lens according to embodiments of the disclosure includes: two transparent substrates, each transparent substrate being provided with two optical surfaces; and two optical waveguide arrays, arranged between the two transparent substrates by means of glue, optical waveguide extending directions of the two optical waveguide arrays being arranged orthogonally; each optical waveguide array including a plurality of optical waveguide units, each optical waveguide unit having a rectangular cross section, and the plurality of optical waveguide units being joined in parallel; an outer contour of the optical waveguide array being a rectangle and an extending direction of the optical waveguide unit and at least two sides of the outer contour of the optical waveguide array forming an angle of 30 to 60 degrees.

Additional aspects and advantages of the disclosure will be set forth in part in the following description which follows, and some will become obvious from the following description or learned through practice of the disclosure.

BRIEF DESCRIPTION OF DRAWINGS

The above and/or additional aspects and advantages of the disclosure will become apparent and readily appreciated from the following description of embodiments, taken in conjunction with the accompanying drawings, in which.

Figure 1A:
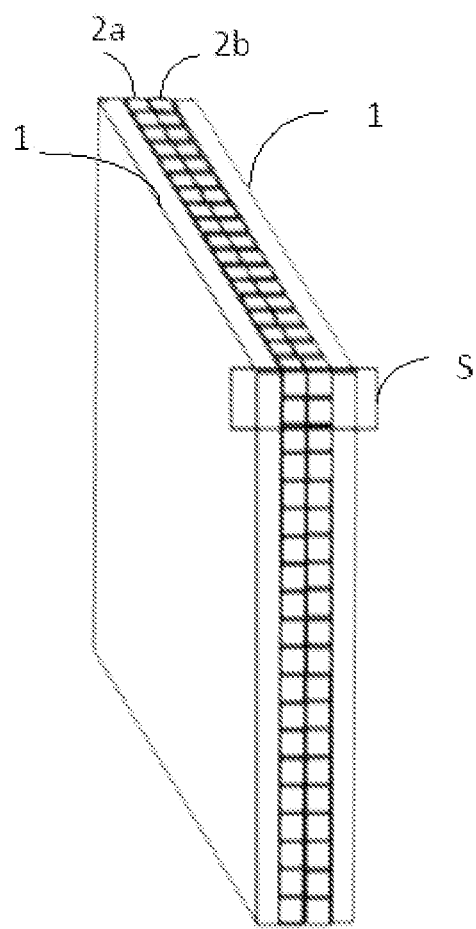
FIG. 1a is a schematic view of an optical lens according to embodiments of the disclosure.
Figure 1B:
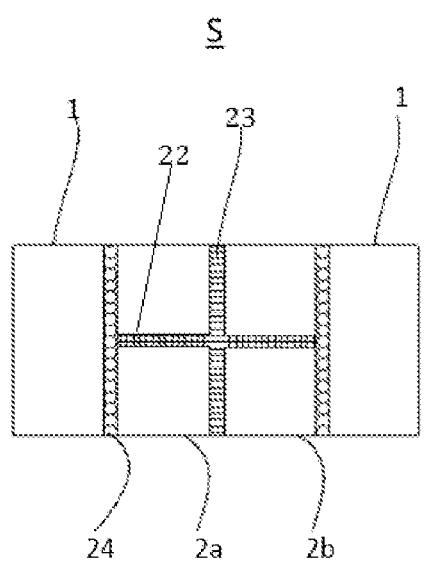
FIG. 1b is an enlarged view of FIG. 1a at block S.

The reference numerals:
optical lens 100; transparent substrate 1; antireflection film 11;
optical waveguide array 2; first optical waveguide array 2a; second optical waveguide array 2b;
optical waveguide unit 21; optical waveguide subunit 210; first adhesive layer 22; second adhesive layer 23; third adhesive layer 24;
first optical waveguide unit 211; first long side 2111; closed side 2112; second optical waveguide unit 212;
third optical waveguide unit 213; fourth optical waveguide unit 214;
first sub-array 201; second sub-array 202; third sub-array 203;
fourth sub-array 204; the fifth sub-array 205.

DETAILED DESCRIPTION

The description will now be made in detail to embodiments of the disclosure, examples of which are illustrated in the accompanying drawings. The following description refers to the accompanying drawings in which the same or similar numbers represent the same or similar elements or the elements having same or similar functions throughout the description. The embodiments illustrated herein with reference to the accompanying drawings are explanatory, illustrative, and used to explain the disclosure, but shall not be understood as a limitation to the disclosure.

In the description of the disclosure, it is to be understood that, terms such as "central", "above", "below", "vertical", "horizontal", "top", "bottom" "inner", "outer", and the like refer to directions and location relations which are directions and location relations illustrated in the drawings, and for describing the disclosure and for describing in simple, and which are not intended to indicate or imply that devices or elements are disposed to locate at the specific directions or are structured and performed in the specific directions, which could not to be understood to the limitation of the disclosure.

It should be noted that terms "first" and "second" are only used herein for purposes of description and are not intended to indicate or imply relative importance or significance, or to implicitly indicate the number of indicated technical features. Thus, the feature defined with "first" and "second" may include one or more this feature. Furthermore, in the description of the disclosure, "a plurality of" means two or more than two, unless specified otherwise.

An optical lens 100 according to embodiments of a first aspect of the disclosure may include two transparent substrates 1 and two optical waveguide arrays 2. In the following description, the two optical waveguide arrays may be labeled as 2a and 2b, respectively.

Figure 3A:
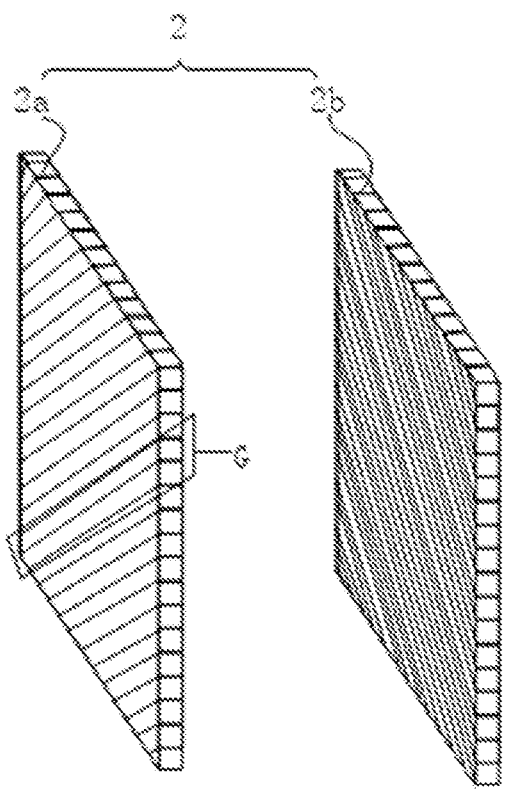
FIG. 3a is a schematic view of optical waveguide arrays of an optical lens according to embodiments of the disclosure, where two optical waveguide arrays are arranged orthogonally.
Figure 3B:
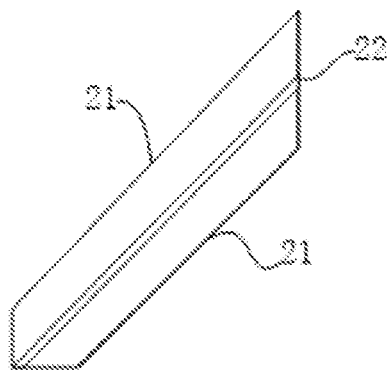
FIG. 3b is an enlarged view of FIG. 3a at block G.

Each transparent substrate 1 is provided with two optical surfaces. The optical surfaces are configured to protect the optical waveguide arrays 2a, 2b. The two optical waveguide arrays 2 are arranged between the two transparent substrates 1 by means of glue. Optical waveguide extending directions of the two optical waveguide arrays 2 are arranged orthogonally. Each optical waveguide array 2 includes a plurality of optical waveguide units 21. Each optical waveguide unit 21 has a rectangular cross section. The plurality of optical waveguide units 21 are joined in parallel. An outer contour of the optical waveguide array 2 is a rectangle. An extending direction of the optical waveguide unit 21 and at least two sides of the outer contours of the optical waveguide arrays 2a, 2b may form an angle of 30 to 60 degrees. In examples illustrated in FIGS. 3a and 3b, the extension direction of the optical waveguide unit 21 and the at least two sides of the outer contours of the optical waveguide arrays 2a, 2b are at an angle of 45 degrees.

The optical waveguide extending directions of the two optical waveguide arrays 2a, 2b are arranged orthogonally to form an equivalent flat lens with a negative refractive index. The extension directions of the optical waveguide units 21 in the optical waveguide arrays 2a, 2b are perpendicular to each other, so that a light beam may be converged to one point and it may be ensured that an object plane and an image plane are symmetric with respect to the equivalent flat lens with the negative refractive index, resulting in a negative refractive index phenomenon and realizing imaging of the flat lens.

Figure 4:
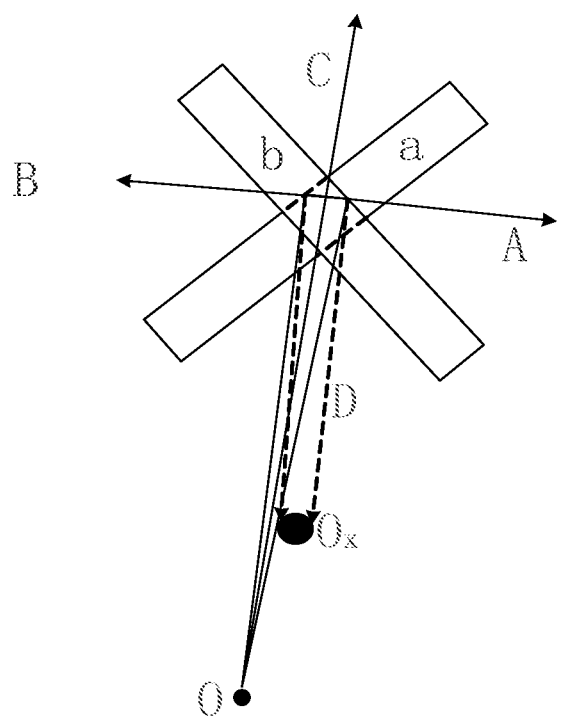
FIG. 4 is a schematic diagram of a principle for modulating light in an overlapping region when two optical waveguide units are placed orthogonally according to embodiments of the disclosure.
Figure 5:
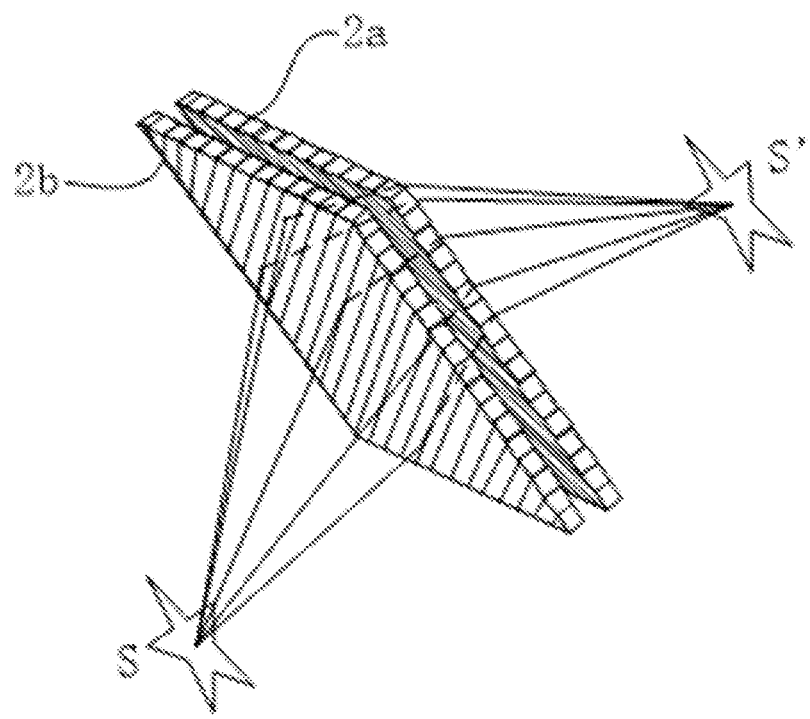
FIG. 5 is a schematic view of a principle for imaging when two optical waveguide arrays are orthogonal according to embodiments of the disclosure.

FIG. 4 is a schematic diagram of a principle for modulating light in an overlapping region when two optical waveguide units are placed orthogonally, in which a and b denote two optical waveguide units. The incident light from an object-side light source point O may be reflected by an interior of an equivalent waveguide unit to form four light beams, as illustrated in FIG. 4. D is an imaging light beam for imaging and other three light beams are stray light which are denoted as A, B and C. O denotes the object-side light source point, and Ox denotes an image-side imaging point. In order to reduce the influence of the ghost image caused by the stray light on the imaging, the two optical waveguide arrays are arranged along 45° and orthogonal to each other. Therefore, the object-side light beam and the image-side light beam are mirror-symmetric with respect to the equivalent flat lens with the negative refractive index, and a refractive refraction index phenomenon occurs, thereby realizing imaging of the flat lens, as illustrated in FIG. 5.

Optionally, the plurality of optical waveguide units 21 in each optical waveguide array 2 have the same shape and size on the cross section. Therefore, the imaging effect is better.

According to the optical lens provided in the embodiments of the disclosure, the plurality of optical waveguide units 21 are arranged and spliced at the predetermined angle to form the optical waveguide array and the two optical waveguide arrays are arranged orthogonally to each other, which may reduce ghosting of stray light on imaging. The imaging effect is better.

According to some embodiments of the disclosure, the plurality of optical waveguide units 21 are joined through a first adhesive layer 22. A thickness of the first adhesive layer 22 is greater than 0.001 mm. The optical waveguide arrays 2a, 2b are adhered to each other through the second adhesive layers 23. The optical waveguide arrays 2a, 2b are respectively adhered to the transparent substrates 1 through third adhesive layers 24. Optionally, the first adhesive layer 22 and the second adhesive layer 23 may be photosensitive adhesive or heat-sensitive adhesive.

Figure 2:
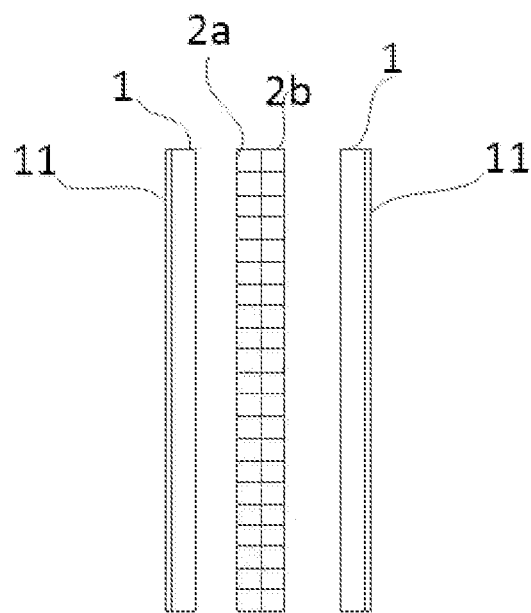
FIG. 2 is a schematic view of another optical lens according to embodiments of the disclosure.

In some embodiments of the disclosure, as illustrated in FIG. 2, an optical surface of each transparent substrate 1 away from the optical waveguide array 2 is provided with an antireflection film 11. The imaging effect is further improved.

The structure of the optical waveguide array 2 in the optical lens according to some embodiments of the disclosure will be described below with reference to FIGS. 6 and 7. Generally, optical waveguide unit(s) 21 extending between two opposite corners of the rectangular optical waveguide array may have the longest length; optical waveguide units 21 located at other two opposite corners are triangles and have the shortest length; and middle optical waveguide units are in a trapezoidal or parallelogram structure and the lengths of the optical waveguides are unequal. In some further alternative examples, the optical waveguide unit extending between two opposite corners of the square optical waveguide array 2 may be used as a reference, the optical waveguide units on both sides of the optical waveguide unit extending between two opposite corners may be symmetrically arranged.

Specifically, each optical waveguide array 2 includes at least one first optical waveguide unit 211, multi-level second optical waveguide units 212, multi-level third optical waveguide units 213 and two fourth optical waveguide units 214. The outer contour of the optical waveguide array 2 is formed into a rectangle. The extension directions of the first optical waveguide unit 211, the second optical waveguide unit 212, the third optical waveguide unit 213 and the fourth optical waveguide unit 214 have an angle θ with the outer contour of the optical waveguide array 2. The angle θ is 30-60 degrees. In the alternative examples of FIG. 6 and FIG. 7, the angle θ is 45 degrees.

The first optical waveguide unit 211 is closest to or located on a diagonal of the optical waveguide array 2. In an example in FIG. 6, the outer contour of the optical waveguide array 2 is a square. At this time, there is one first optical waveguide unit 211 and the first optical waveguide unit 211 is located on the diagonal of the square. In an example in FIG. 7, the outer contour of the optical waveguide array 2 is a rectangle. At this time, there are a plurality of first optical waveguide units 211 arranged in parallel and arranged adjacent to the diagonal of the rectangle.

Figure 6:
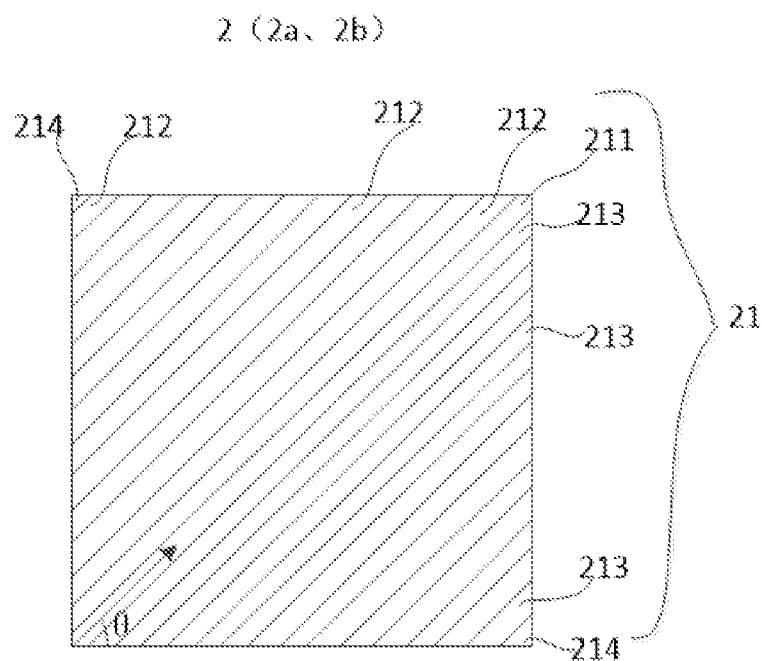
FIG. 6 is a schematic view of a square optical waveguide array of an optical lens according to embodiments of the disclosure.
Figure 7:
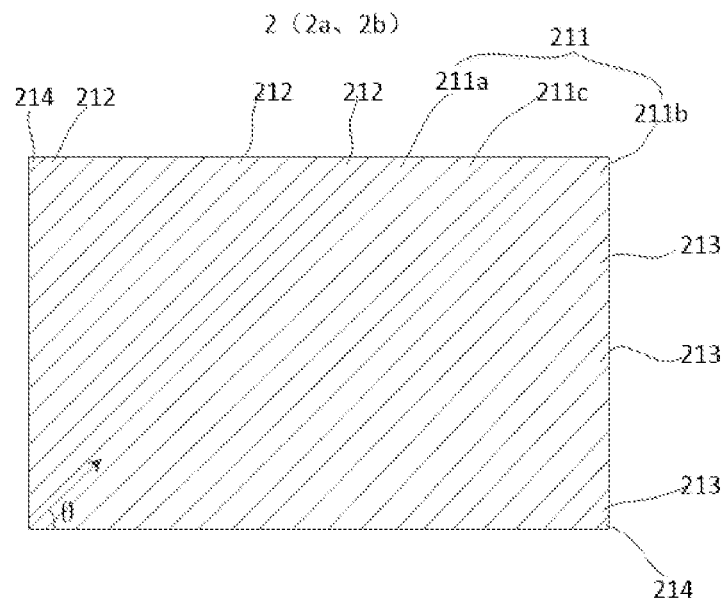
FIG. 7 is a schematic view of a rectangular optical waveguide array of an optical lens according to embodiments of the disclosure.

As illustrated in FIGS. 6 and 7, the multi-level second optical waveguide units 212 are sequentially adhered to one side of the first optical waveguide unit 211 and have gradually-reduced lengths. The multi-level third optical waveguide units 213 are sequentially adhered to another side of the first optical waveguide unit 211 and have gradually-reduced lengths. A third optical waveguide unit 213 and a second optical waveguide unit 212 in the same level have the same structure and size and are arranged at 180 degrees to each other. Optionally, the second optical waveguide unit 212 is formed into a trapezoidal shape. The two fourth optical waveguide units 214 are both triangular in shape and are respectively adhered to a last-level second optical waveguide unit 212 and a last-level third optical waveguide unit 213.

Figure 8A:
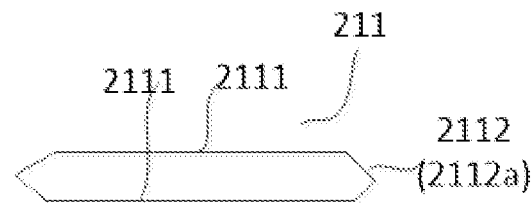
FIG. 8a-8f are schematic views of various optical waveguide units in an optical waveguide array of an optical lens according to embodiments of the disclosure.
Figure 8B:
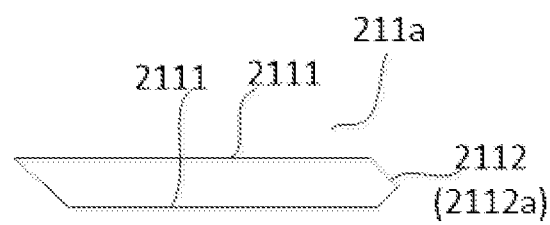
Figure 8C:
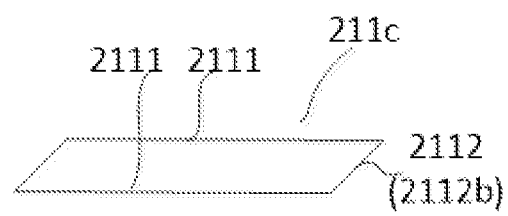
Figure 8D:
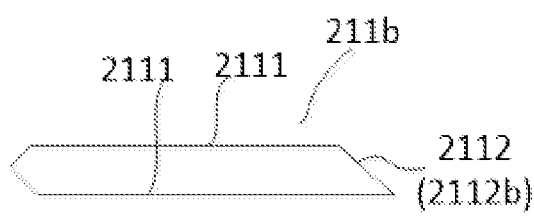
Figure 8E:
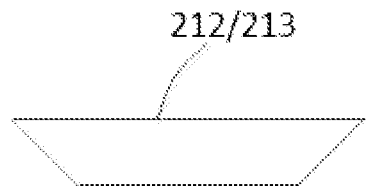
Figure 8F:
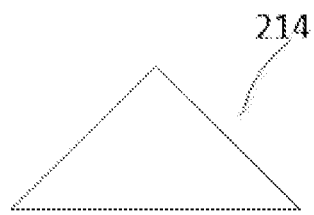

In some embodiments of the disclosure, the first optical waveguide unit 211 includes two first long sides 2111 arranged oppositely and two closed sides 2112 respectively for closing both ends of the two first long sides 2111. The closed side 2112 is a straight line shape or a polyline shape. As illustrated in FIG. 6, when the outer contour of the optical waveguide array 2 is a square, the first optical waveguide unit 211 extends along the diagonal of the optical waveguide array 2 and its two closed sides 2112 are both polyline closed sides 2112a (as illustrated in FIG. 8a). As illustrated in FIG. 7, when the outer contour of the optical waveguide array 2 is a rectangle, there are a plurality of first optical waveguide units 211 arranged in parallel. Two first optical waveguide units 211 among the plurality of first optical waveguide units 211 each has a closed side 2112b in the straight line shape and a closed side 2112a in the polyline shape, and are arranged at 180 degrees to each other. A remaining first optical waveguide units have closed sides in the polyline shape and located between the two first optical waveguide units. Extension lengths of the plurality of first optical waveguide units are substantially equal.

In a specific embodiment, as illustrated in FIG. 6, the outer contour of the optical waveguide array 2 is a square and the optical waveguide array 2 includes: a first optical waveguide unit 211 extending along one of diagonals, multi-level second optical waveguide units 212 sequentially adhered to one side of the first optical waveguide unit 211 and having gradually-reduced lengths, multi-level third optical waveguide units 213 sequentially adhered to another side of the first optical waveguide unit 211 and having gradually-reduced lengths, and two fourth optical waveguide units 214 oppositely arranged to another of the diagonals. The first optical waveguide unit 211, as illustrated in FIG. 8a, includes two first long sides 2111 arranged oppositely and two closed sides 2112a in the polyline shape. The second optical waveguide units 212 and the third optical waveguide units 213 all are trapezoidal in shape and arranged 180 to each other. In some optional embodiments, the second optical waveguide units 212 and the third optical waveguide units 213 all are isosceles trapezoids, that is, the second optical waveguide units 212 and the third optical waveguide units 213 are symmetric with respect to the first optical waveguide unit 211.

As illustrated in FIG. 7, in another specific embodiment, the outer contour of the optical waveguide array 2 is a rectangle. There are a plurality of first optical waveguide units 211 and the plurality of first optical waveguide units 211 form an angle θ with the outer contour of the optical waveguide array 2. The plurality of first optical waveguide units 211 includes two first optical waveguide units 211a and 211b each having a closed side 2112b in the straight line shape and a closed side 2112a in the polyline shape. The first optical waveguide units 211a and 211b are arranged at 180 degrees to each other. There are a plurality of first optical waveguide units 211c whose two closed sides are both the straight line shape between the units 211a and 211b. In the illustrated example, the extension lengths of the first optical waveguide units 211a, 211b and 211c are all substantially equal. The second optical waveguide units 212 and the third optical waveguide units 213 all are trapezoidal in shape and arranged 180 to each other. In some optional embodiments, the second optical waveguide units 212 and the third optical waveguide units 213 all are isosceles trapezoids. Two fourth optical waveguide units 214 are respectively located on, the side of the second optical waveguide unit 212 and the side of the third optical waveguide unit 213 away from the first optical waveguide units 211, and are oppositely arranged on a diagonal of the rectangle.

Figure 9:
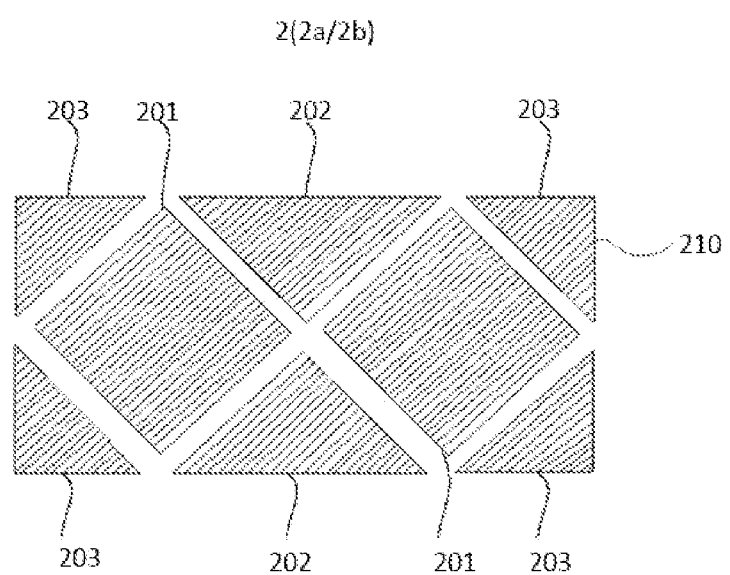
FIG. 9 is a schematic view of an optical lens being spliced when an outer contour of the optical lens is a rectangle according to embodiments of the disclosure.

In addition, a large-size requirement may be achieved by splicing a plurality of optical waveguide arrays when a large screen is displayed. According to some embodiments of the disclosure, as illustrated in FIG. 9, the outer contour of the optical waveguide array 2 is formed as a rectangle and is formed by splicing the following array units: a plurality of first sub-arrays 201, a plurality of second sub-arrays 202 and four third sub-arrays 203. In detail, the outer contour of the first sub-array 201 is formed as a square and the plurality of first sub-arrays 201 are sequentially connected along diagonal directions thereof. The outer contour of the second sub-array 202 is formed as an isosceles triangle shape. A length of each waist side of the two sub-array 202 is the same as a length of a side of the first sub-array 201. Top corners of the two second sub-arrays 202 face each other and embedded between two adjacent first sub-arrays 201. The outer contour of the third sub-array 203 is formed as an isosceles triangle shape. A length of a bottom side of the third sub-array 203 is the same as the length of the side of the first sub-array 201. The four third sub-arrays 203 are respectively arranged outside two first sub-arrays 201 located at head and end.

A number of the first sub-arrays 201 is M, a number of the second sub-arrays 202 is N, and a relationship between M and N satisfies a formula of:

$$N=(M-1)*2.$$

The first sub-arrays 201, the second sub-arrays 202 and the third sub-arrays 203 each includes a plurality of optical waveguide subunits 210 arranged in parallel, and extension directions of the optical waveguide subunits 210 in the first sub-arrays 201, the second sub-arrays 202, and the third sub-arrays 203 are consistent to form the optical waveguide units 21, and extension directions of the optical waveguide subunits 210 are parallel to two opposite sides of the first sub-array 201.

In an example as illustrated in FIG. 9, there are two first sub-arrays 201 and the two first sub-arrays 201 are connected along their own diagonals. There are two second sub-arrays 202 and the two second sub-arrays 202 are respectively embedded in the upper and lower parts of the two first sub-arrays 201. The four third sub-arrays 203 are respectively arranged on both sides of the two first sub-arrays 201. Of course, the disclosure is not limited to the description herein. The overall shape of the optical waveguide array may be set based on application scenarios. For example, the number of the first sub-arrays 201 may be three, the number of the second sub-arrays 202 may be four, and the number of the third sub-arrays 203 may be four; when the number of the first sub-arrays 201 is four, the number of the second sub-arrays 202 may be six and the number of the third sub-arrays 203 may be four. In addition, if necessary, the spliced large-size rectangular optical waveguide array 2 may also be spliced continuously in its length direction or its width direction, and the disclosure does not impose any limitation herein.

Figure 10:
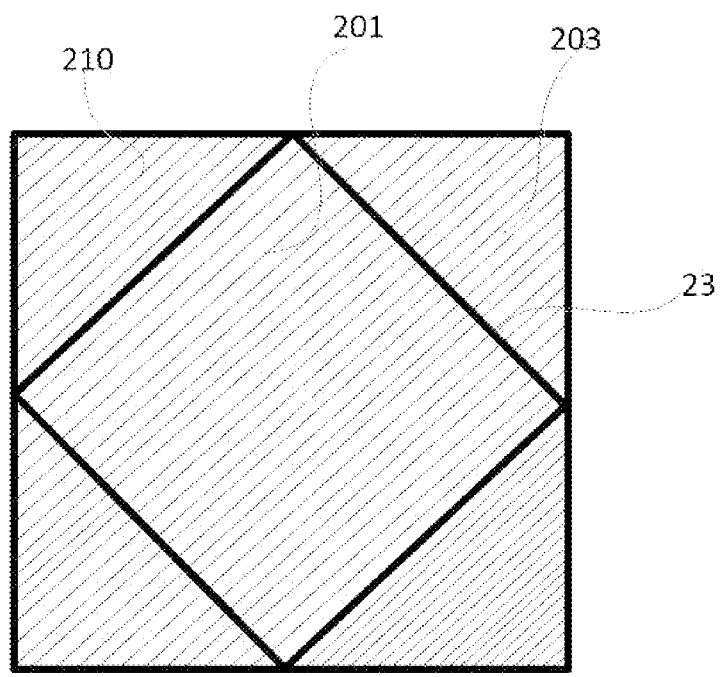
FIG. 10 is a schematic view of another optical lens being spliced when an outer contour of the optical lens is a square according to embodiments of the disclosure.

In another example illustrated in FIG. 10, the outer contour of the optical waveguide array 2 may be formed as a square and formed by splicing a first sub-array 201 and four third sub-arrays 203 adhered respectively to four sides of the first sub-array 201. The outer contour of the first sub-array 201 is formed into a square. The outer contour of the third sub-array 203 is formed into an isosceles triangle shape. A length of a bottom side of the third sub-array 203 is the same as a length of a side of the sub-array 201. As illustrated in FIG. 10, the first sub-array 201 and the third sub-arrays 203 each includes a plurality of optical waveguide subunits 210 arranged in parallel. Extension directions of the optical waveguide subunits 210 in the first sub-array 201 and the third sub-arrays 203 are consistent and form an angle of 45 degrees with any side of the outer contour of the optical waveguide array 2.

Figure 11:
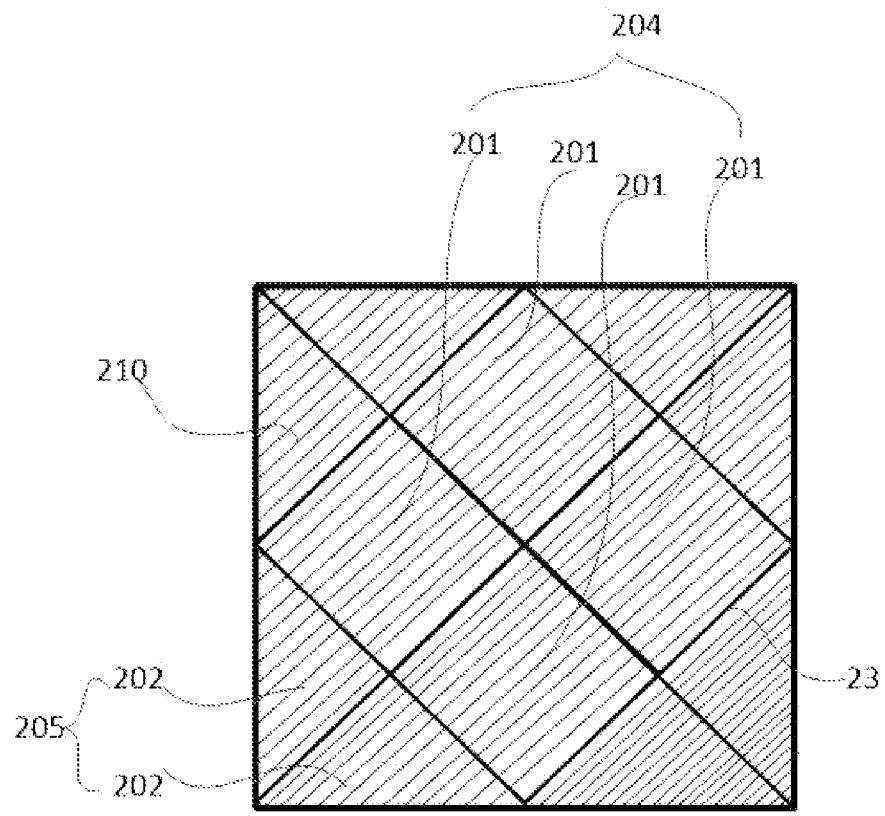
FIG. 11 is a schematic view of still another optical lens being spliced when an outer contour of the optical lens is a square according to embodiments of the disclosure.
Figure 12:
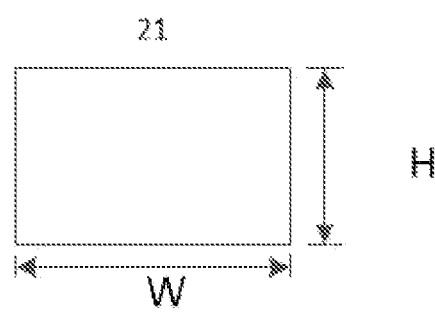
FIG. 12 is a cross-sectional view of an optical waveguide unit of an optical lens according to embodiments of the disclosure, where W is a width and H is a height.

In still another example illustrated in FIG. 11, the outer contour of the optical waveguide array 2 may be formed as a square and formed by splicing the following array units: a fourth sub-array 204 and four fifth sub-arrays 205 respectively adhered to four sides of the fourth sub-array 204. As illustrated in FIG. 11, the fourth sub-array 204 may be formed by splicing four first sub-arrays 201. The outer contour of each first sub-array 201 is formed into a square. The outer contour of the fifth sub-array 205 is formed into an isosceles triangle shape. A length of a bottom side of the fifth sub-array 205 is the same as a length of a side of the four sub-array 204. Each fifth sub-array 205 is formed by splicing two second sub-arrays 202. The outer contour of each second sub-array 202 is formed into an isosceles triangle shape. A length of each waist side of the second sub-array 202 is the same as a length of a side of the first sub-array 201. Further, the first sub-arrays 201 and the second sub-arrays 202 each includes a plurality of optical waveguide subunits 210 arranged in parallel, and extension directions of the optical waveguide subunits 210 in the first sub-arrays 201 and the second sub-arrays 202 are consistent and form an angle of 45 degrees with any side of the outer contour of the optical waveguide array 2.

According to the optical lens provided in the embodiments of the disclosure, the plurality of sub-arrays are spliced into the optical waveguide array and the processing manner of the large screen is converted into the splicing of various types of optical waveguide arrays, which reduces the manufacturing difficulty to a certain extent, improves the processing efficiency, and satisfies requirements of various application scenes. In addition, the imaging characteristics are better.

In some embodiments of the disclosure, when the optical waveguide array needs to be spliced through sub-arrays, the array units are spliced by the second adhesive layer 23, and the refractive index of the second adhesive layer 23 is greater than that of the optical waveguide unit 210. As illustrated in FIG. 11, optionally, the first adhesive layer 22 and the second adhesive layer 23 use adhesive materials with the same refractive index.

In the embodiments in FIG. 10, a width of the cross section of the optical waveguide unit 21 is W and a length of the cross section of the optical waveguide unit 21 is H, the width W and the length H of the cross section satisfy following conditions of: 0.1 mm<W<5 mm and 0.1 mm<H<5 mm.

Reference throughout this specification to "an embodiment," "some embodiments," "one embodiment", "another example," "an example," "a specific example," or "some examples," means that a particular feature, structure, material, or characteristic described in connection with the embodiments or examples is included in at least one embodiments or examples of the disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiments or examples of the disclosure. Furthermore, the particular features, structures, materials, or characteristics may be combined in any suitable manner in one or more embodiments or examples.

Although explanatory embodiments have been illustrated and described, it would be appreciated by those skilled in the art that the above embodiments cannot be construed to limit the disclosure, and changes, alternatives, and modifications can be made in the embodiments without departing from spirit, principles and scope of the disclosure.

The invention claimed is:

1. An optical lens, comprising:
two transparent substrates, each transparent substrate being provided with two optical surfaces; and
two optical waveguide arrays, arranged between the two transparent substrates by means of glue, optical waveguide extending directions of the two optical waveguide arrays being arranged orthogonally; each optical waveguide array comprising a plurality of optical waveguide units, each optical waveguide unit having a rectangular cross section, and the plurality of optical waveguide units being joined in parallel; an outer contour of the optical waveguide array being a rectangle and an extending direction of the optical waveguide unit and at least two sides of the outer contour of the optical waveguide array forming an angle of 30 to 60 degrees,
wherein the outer contour of the optical waveguide array is a rectangle and is formed by splicing the following array units: a plurality of first sub-arrays, wherein an outer contour of the first sub-array is a square, and the plurality of first sub-arrays are sequentially connected along diagonal directions thereof; a plurality of second sub-arrays, wherein an outer contour of the second sub-array is an isosceles triangle shape, a length of each waist side of the second sub-array is the same as a length of a side of the first sub-array, and top corners of the two second sub-arrays face each other and are embedded between two adjacent first sub-arrays; and four third sub-arrays, wherein an outer contour of the third sub-array is an isosceles triangle shape, a length of a bottom side of the third sub-array is the same as the length of the side of the first sub-array, and the four third sub-arrays are respectively arranged outside two first sub-arrays located at head and end, wherein, a number of the first sub-arrays is M, a number of the second sub-arrays is N, and a relationship between M and N satisfies a formula of: N=(M−1)*2, the first sub-arrays, the second sub-arrays and the third sub-arrays each includes a plurality of optical waveguide subunits arranged in parallel, and extension directions of the optical waveguide subunits in the first sub-arrays, the second sub-arrays, and the third sub-arrays are consistent to form the optical waveguide units, and extension directions of the optical waveguide subunits are parallel to two opposite sides of the first sub-array; or wherein the outer contour of the optical waveguide array is a square, and formed by a first sub-array and four third sub-arrays adhered respectively to four sides of the first sub-array, an outer contour of the first sub-array is formed into a square, and an outer contour of the third sub-array is formed into an isosceles triangle shape, in which a length of a bottom side of the third sub-array is the same as a length of a side of the sub-array; the first sub-array and the third sub-arrays each includes a plurality of optical waveguide subunits arranged in parallel, and extension directions of the optical waveguide subunits in the first sub-array and the third sub-arrays are consistent and form an angle of 45 degrees with any side of the outer contour of the optical waveguide array; or wherein the outer contour of the optical waveguide array is a square and formed by splicing the following array units: a fourth sub-array, formed by splicing four first sub-arrays, and an outer contour of each first sub-array is formed into a square, four fifth sub-arrays respectively adhered to four sides of the fourth sub-array, an outer contour of the fifth sub-array is formed into an isosceles triangle shape, and a length of a bottom side of the fifth sub-array is the same as a length of a side of the four sub-array, wherein each fifth sub-array is formed by splicing two second sub-arrays, an outer contour of each second sub-array is formed into an isosceles triangle shape, and a length of each waist side of the second sub-array is the same as a length of a side of the first sub-array, wherein, the first sub-arrays and the second sub-arrays each includes a plurality of optical waveguide subunits arranged in parallel, and extension directions of the optical waveguide subunits in the first sub-arrays and the second sub-arrays are consistent and form an angle of 45 degrees with any side of the outer contour of the optical waveguide array.

2. The optical lens as claimed in claim 1, wherein the plurality of optical waveguide units are joined through a first adhesive layer and a thickness of the first adhesive layer is more than 0.001 mm.

3. The optical lens as claimed in claim 1, wherein an optical surface of each transparent substrate away from the optical waveguide array is provided with an antireflection film.

4. The optical lens as claimed in claim 1, wherein each optical waveguide array comprises:
at least one first optical waveguide unit, closest to or located on a diagonal of the optical waveguide array;
multi-level second optical waveguide units, sequentially adhered to one side of the first optical waveguide unit and have gradually-reduced lengths;
multi-level third optical waveguide units, sequentially adhered to another side of the first optical waveguide unit and have gradually-reduced lengths, wherein a third optical waveguide unit and a second optical waveguide unit in the same level have the same structure and size and are arranged at 180 degrees to each other; and
two fourth optical waveguide units, wherein the two fourth optical waveguide units are triangular and are respectively adhered to a last-level second optical waveguide unit and a last-level third optical waveguide unit,
wherein, the first optical waveguide unit, the second optical waveguide units, the third optical waveguide units and the fourth optical waveguide units form the optical waveguide array with a rectangular outer contour.

5. The optical lens as claimed in claim 4, wherein the first optical waveguide unit comprises two first long sides arranged oppositely and two closed sides respectively for closing both ends of the two first long sides, and the closed side is a straight line shape or a polyline shape.

6. The optical lens as claimed in claim 5, wherein when the outer contour of the optical waveguide array is a square, the first optical waveguide unit extends along the diagonal of the optical waveguide array and the closed sides of the first optical waveguide unit are the polyline shape.

7. The optical lens as claimed in claim 5, wherein when the outer contour of the optical waveguide array is a rectangle, there are a plurality of first optical waveguide units arranged in parallel, two first optical waveguide units among the plurality of first optical waveguide units each has a closed side in the straight line shape and a closed side in the polyline shape, and are arranged at 180 degrees to each other;
a remaining first optical waveguide units have closed sides in the polyline shape and located between the two first optical waveguide units; and
extension lengths of the plurality of first optical waveguide units are substantially equal.

8. The optical lens as claimed in claim 4, wherein the second optical waveguide units are formed into a trapezoidal shape.

9. The optical lens as claimed in claim 1, wherein a shape and a size of the cross section of each of the plurality of optical waveguide units in each optical waveguide array are the same.

10. The optical lens as claimed in claim 1, wherein the outer contour of the optical waveguide array is the rectangle, and the array units are spliced by a second adhesive layer and a refractive index of the second adhesive layer is greater than a refractive index of the optical waveguide unit.

11. The optical lens as claimed in claim 1, wherein a width of the cross section of the optical waveguide unit is W and a length of the cross section of the optical waveguide unit is H, the width W and the length H of the cross section satisfy following conditions of: 0.1 mm<W<5 mm and 0.1 mm<H<5 mm.

* * * * *